United States Patent [19]
Bessler et al.

[11] Patent Number: 5,463,876
[45] Date of Patent: Nov. 7, 1995

[54] CONTROL SYSTEM FOR REFRIGERANT METERING SOLENOID VALVE

[75] Inventors: Warren F. Bessler, Schenectady; Frank J. Bowden, Latham, both of N.Y.

[73] Assignee: General Electric Company, Schenectady, N.Y.

[21] Appl. No.: 222,051

[22] Filed: Apr. 4, 1994

[51] Int. Cl.⁶ ............................. F25B 49/00; F25B 41/04
[52] U.S. Cl. .................. 62/223; 62/211; 251/129.05
[58] Field of Search .................... 62/204, 205, 206, 62/210, 211, 212, 222, 223, 224, 225; 251/129.05, 129.08; 236/46 F, 78 D, 78 B, 75

[56] References Cited

U.S. PATENT DOCUMENTS

| | | | |
|---|---|---|---|
| Re. 33,775 | 12/1991 | Behr et al. ................ | 251/129.05 X |
| 3,698,204 | 10/1972 | Schlotterbeck et al. ........ | 62/206 |
| 3,778,025 | 12/1973 | Lane et al. ................ | 251/129.08 |
| 4,112,703 | 9/1978 | Kountz .................... | 62/211 |
| 4,167,858 | 9/1979 | Kojima et al. .............. | 62/126 |
| 4,420,113 | 12/1983 | Lacroix ................... | 236/46 F X |
| 4,634,046 | 1/1987 | Tanaka .................... | 236/46 F |
| 4,638,837 | 1/1987 | Buike et al. ............... | 251/129.05 X |
| 4,651,535 | 3/1987 | Alsenz .................... | 62/225 |
| 4,653,288 | 3/1987 | Sayo et al. ................ | 62/210 |
| 4,677,830 | 7/1987 | Sumikawa et al. ............ | 62/126 |
| 4,745,767 | 5/1988 | Ohya et al. ................ | 62/211 |
| 4,910,972 | 3/1990 | Jaster .................... | 62/335 |
| 5,247,989 | 9/1993 | Benevelli ................. | 165/30 |
| 5,255,529 | 10/1993 | Powell et al. .............. | 62/180 |
| 5,255,530 | 10/1993 | Janke ..................... | 62/180 |

OTHER PUBLICATIONS

Buxton, Joseph, "Solid State Circuits Simplify Temperature Sensing & Control," Electronic Component News, vol. 37, No. 10, ECN Sensors Supplement, Oct. 1993.

*Primary Examiner*—Harry B. Tanner
*Attorney, Agent, or Firm*—Paul R. Webb, II

[57] ABSTRACT

A system including a control circuit and a sensing circuit controls an expansion valve in a refrigeration system using pulse width modulation. The control circuit includes a ramp generator, a pulse width modulator, and a power switch. In response to input from the sensing circuit, the control circuit produces a control signal which cyclically opens and closes the valve. The average flow rate through the valve is varied in accordance with a condition of the refrigeration system which is detected by the sensing circuit.

18 Claims, 3 Drawing Sheets

CONTROL SYSTEM FOR REFRIGERANT METERING SOLENOID VALVE

BACKGROUND OF THE INVENTION

This invention relates generally to refrigerant expansion control in refrigeration systems and more particularly concerns electronic circuitry for controlling pulse width modulated solenoid valves. As used herein, the term "refrigeration system" refers to refrigerators, air conditioners or any other system which produces a refrigeration effect.

Conventional refrigeration systems used in household refrigerators typically operate on the simple vapor compression cycle. Such a cycle includes a compressor, a condenser, an expansion device, and an evaporator all connected in series in the order given and charged with a refrigerant. The refrigerant is compressed by the compressor to high temperature and pressure and then condensed by the condenser where it loses heat to the ambient. The liquid refrigerant next flows through an expansion device, such as an expansion valve or a capillary tube, so that it undergoes adiabatic expansion. The now low pressure refrigerant flows through the evaporator and is vaporized by absorbing heat from air passing over the evaporator. The cooled air is used to refrigerate one or more refrigerator compartments. The gaseous or mostly gaseous refrigerant exiting the evaporator is returned to the compressor via a suction line to repeat the cycle.

Household refrigerators typically use a capillary tube to control refrigerant expansion because it is a simple, low cost device. However, capillary tubes have a number of limitations as expansion devices. For instance, capillary tubes must be made very long to allow an inside diameter which is manufacturable and large enough to avoid clogging. This needed length takes up space in the refrigerator. The use of capillary tube expansion control also requires very precise refrigerant charging operations during production because the flow rate through the capillary tube is highly sensitive to the amount of refrigerant charge in the system.

Furthermore, a capillary tube can be sized to provide the optimum refrigerant flow rate for only one operating condition. Capillary tubes are thus typically sized to provide the optimum flow rate for normal operating conditions. This means that when the refrigeration cycle begins (as well as under high load conditions), the capillary tube is undersized, and the evaporator is starved of refrigerant. This reduces the cooling capacity and efficiency of the refrigerator. Near the end of the refrigeration cycle, the capillary tube will be oversized and the evaporator will be flooded, again reducing efficiency. Because of this, cycle efficiency using capillary tube expansion is considerably below that attainable with active expansion control.

However, active expansion control, in the form of conventional thermostatic expansion valves, does not work well in household refrigerators. While thermostatic expansion valves are often used in automotive air conditioning and commercial refrigeration systems which have large refrigerant flow rates, they cannot be made with orifices small enough to regulate the very low flow rates (typically 10–12 lb/hr) of household refrigerators. That is, to achieve the required pressure drop, the valve orifice would need to be on the order of 10 mils or less, a size that is impractical to manufacture and very susceptible to plugging. A pulse width modulated solenoid valve is a possible alternative to thermostatic expansion valves, but such a valve requires a controller which can respond to changes in an operating condition of the refrigeration system.

Accordingly, there is a need for a control circuit which can control a pulse width modulated solenoid valve so as to produce maximum cooling capacity and efficiency in a refrigeration system.

SUMMARY OF THE INVENTION

The above-mentioned needs are met by the present invention which provides an expansion valve control system comprising a control circuit and a sensing circuit. The control circuit produces a pulse width modulated control signal which cyclically opens and closes a solenoid valve. The pulse width of the control signal determines the average flow rate through the valve. The duty cycle of the valve is varied in accordance with a condition of the refrigeration system which is detected by the sensing circuit.

Specifically, the control circuit includes a ramp generator, a pulse width modulator, and a power switch. The pulse width modulator is a comparator which compares a sensor signal from the sensing circuit and a reference signal from the ramp generator and produces a positive voltage whenever the sensor signal exceeds the reference signal. The sensing circuit includes one or more sensors such as temperature sensors and has a diode arranged to limit negative values of the sensor signal. The sensing circuit may also have a damping circuit such as an R/C circuit. The ramp generator can comprise an oscillator, a counter and a digital-to-analog convertor. The ramp generator also includes means for providing a negative offset. A field effect transistor or a solid state relay is provided to energize the solenoid coil when the comparator outputs a positive voltage. A switch is connected in series with the solenoid coil and a power supply and opened whenever the refrigeration system is shut down.

Several advantages are realized by the expansion control system of the present invention. The circuitry permits stable operation of the pulse width modulated solenoid valve during start up, defrost, pulldown, and other transient conditions. The system is also low cost, compact, compatible with other electronic controls of the refrigeration system, and consumes minimal power. During the off cycle, the control circuit closes the solenoid valve, thereby preventing refrigerant migration and conserving energy. The solenoid valve therefore acts as an energy valve, eliminating the need for a separate valve to serve this function.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
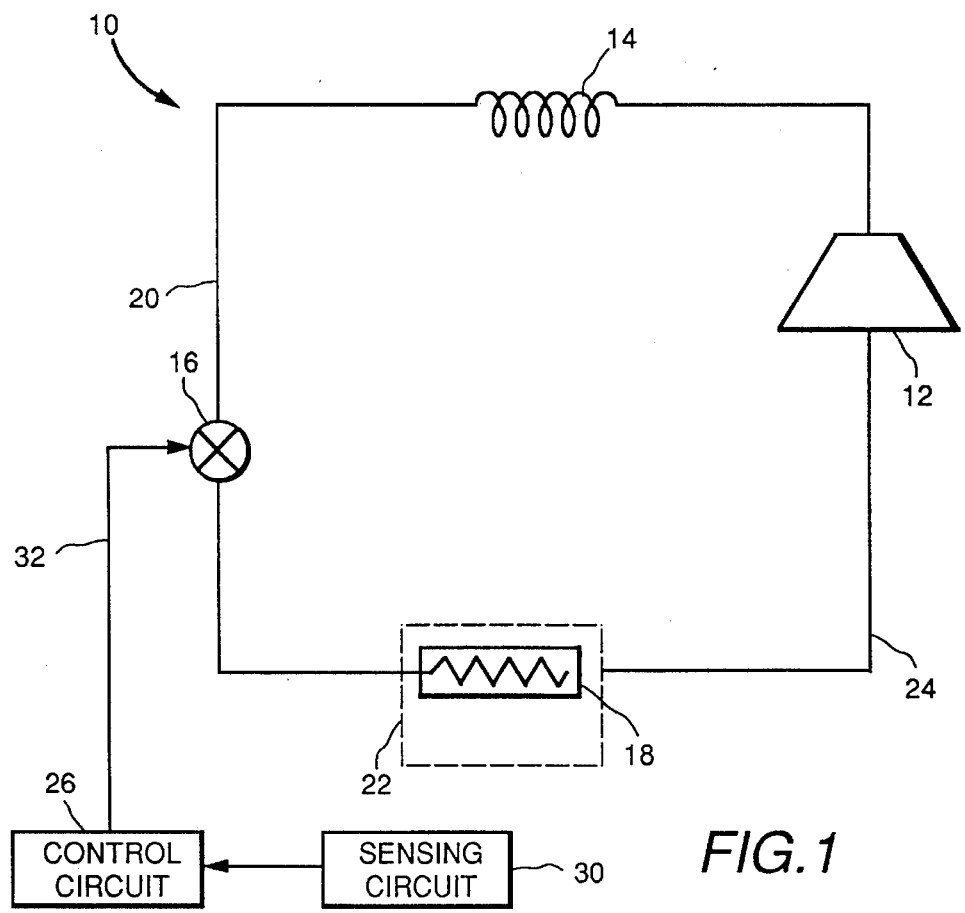
FIG. 1 is a schematic representation of a refrigeration cycle incorporating a pulse width modulated solenoid valve and an associated valve control circuit in accordance with the present invention.

Referring to the drawings wherein identical reference numerals denote the same elements throughout the various views, FIG. 1 shows a refrigeration system 10 comprising a compressor 12, a condenser 14, an expansion valve 16, and an evaporator coil 18, all connected in a closed series loop in the order given. The refrigeration system 10 is charged with a refrigerant which is compressed in the compressor 12. The compressed refrigerant is then discharged to the condenser 14, where it is cooled and condensed and expelled into a liquid line 20. The refrigerant then flows through the expansion valve 16, expanding while it does so. The refrigerant exits from the expansion valve 16 into the evaporator 18 which is preferably disposed within a compartment 22.

As the refrigerant flows through the evaporator 18, it is in a heat exchange relationship with the air in the compartment 22. Thus, heat is transferred from the compartment 22 to the refrigerant flowing through the evaporator 18, causing the liquid refrigerant to evaporate. The refrigerant preferably assumes a slightly superheated gaseous state by the time it exits the evaporator 18. The gaseous refrigerant is then passed through a suction line 24 and returned to the compressor 12, where the cycle is repeated. Although not shown in FIG. 1, it should be understood that the liquid line 20 and the suction line 24 can be arranged in a countercurrent heat exchange relationship so as to improve cycle efficiency. This heat transfer relationship is typically accomplished by soldering the respective lines (or at least portions thereof) together.

Although the refrigeration system 10 is described herein as operating on the simple vapor compression cycle, the present invention is equally applicable to other refrigeration cycles. For instance, the present invention could be used in a refrigeration system operating on the dual evaporator cycle described in U.S. Pat. No. 4,910,972, issued Mar. 27, 1990 to Heinz Jaster and herein incorporated by reference.

The expansion valve 16 is the throttling or metering device which controls the operation of the refrigeration system 10. In accordance with the present invention, the expansion valve 16 is a pulse width modulated solenoid valve which is controlled by a control circuit 26 as part of a closed loop. The control circuit 26 receives a sensor signal 28 from a sensing circuit 30. In response to the sensor signal 28, the control circuit 26 produces a control signal 32 which is fed to the solenoid valve 16. The control signal 32 is a pulse width modulated frequency signal which causes the solenoid valve 16 to oscillate between a fully open condition and a fully closed condition such that the duty cycle of the open-to-closed conditions determines the average flow rate through the expansion valve 16. By adjusting the duty cycle in accordance with the sensor signal 28 the appropriate flow rate is obtained.

The sensing circuit 30 senses a condition of the refrigeration system 10 which provides an indication of how the valve 16 should be controlled. One suitable condition for valve control is the evaporator exit superheat. Superheat is a term of art which is generally defined as the temperature of the gaseous refrigerant exiting the evaporator above the saturated temperature of the refrigerant at the same pressure. In vapor compression cycle refrigeration systems, the difference between the evaporator outlet temperature and the evaporator inlet temperature is an acceptable approximation of the evaporator exit superheat, particularly on evaporators having a low pressure drop from inlet to outlet. Thus, the sensing circuit 30 can include an inlet temperature sensor located at or near the evaporator inlet and an outlet temperature sensor located on the suction line 24. The pulse width of the control signal 32 can be adjusted in accordance with the detected temperature difference to maintain a desired evaporator exit superheat (typically 10°–15° F.) for optimal system performance.

In a second embodiment, valve control can be based on suction line temperature, in which case this temperature should be maintained as close as possible to a desired level. A suction line temperature which is too high indicates a lack of refrigerant in the evaporator 18 which results in reduced cycle efficiency. A suction line temperature which is too low means that liquid refrigerant is being discharged from the evaporator 18 which represents lost cooling capacity. To sense suction line temperature, the sensing circuit 30 can include a temperature sensor located on the suction line 24. In the instance where the suction line 24 and the liquid line 20 are placed in a heat exchange relationship, the sensor is preferably located at the midpoint of the heat exchanger. The pulse width of the control circuit 32 can be adjusted in accordance with the detected suction line temperature to maintain a desired suction line temperature (typically 40°–45° F.) for optimal system performance.

Alternatively, the sensing circuit 30 can include an ambient temperature sensor in addition to a suction line temperature sensor where the difference between the ambient and suction line temperatures is used to control the valve 16. In another possible alternative which can be used when the suction line 24 and the liquid line 20 are placed in a heat exchange relationship, the sensing circuit 30 comprises first and second temperature sensors located on the liquid line 20 at the inlet and exit, respectively, of the heat exchanger between the liquid line 20 and the suction line 24. These two temperature sensors can detect the decrease in the liquid line temperature due to the heat exchange with the suction line 24, thereby providing an indication of the suction line temperature.

In a third embodiment, the sensing circuit 30 could detect evaporator dryness (i.e., the ratio of gaseous to liquid refrigerant in the evaporator). If the evaporator 18 is too dry, then it requires more refrigerant. In vapor compression cycle refrigeration systems, the difference between the evaporator outlet temperature and the air temperature in the refrigerated compartment 22 provides an indication of the evaporator exit dryness. When these two temperatures are close, the evaporator exit is dry and the valve 16 should be opened wider to increase the refrigerant flow rate. Accordingly, the sensing circuit 30 can include an air temperature sensor located in the compartment 22 and an outlet temperature sensor located on the suction line 24. The pulse width of the control signal 32 can be adjusted in accordance with the measured temperature difference to maintain the desired level of evaporator exit dryness for optimal system performance.

Alternatively, dryness of the evaporator could be monitored by measuring the difference between the evaporator inlet temperature and the air temperature in the compartment 22. Generally, as this temperature difference increases, the valve 16 should be opened more to increase the refrigerant flow rate. The sensing circuit 30 can include an air temperature sensor located in the compartment 22 and an inlet temperature sensor located near the evaporator inlet. By adjusting the pulse width of the control signal 32 to maintain this temperature difference at a desired value (about 5°–15° F.), optimal system performance can be achieved.

In a fourth embodiment, the expansion valve 16 is controlled on the basis of maintaining minimal condenser subcooling. Subcooling refers to cooling the liquid refrigerant in the condenser 14 to a temperature below the saturated temperature of the refrigerant at the same pressure. Extensive condenser subcooling means that the condenser 14 will contain an excessive amount of liquid refrigerant, thereby depriving the evaporator 18 of sufficient charge. Also, excessive condenser subcooling causes the saturated temperature in the condenser 14 to increase. Both of these conditions have an adverse impact on cycle efficiency. Accordingly, it is desirable to maintain nearly zero condenser subcooling.

In vapor compression cycle refrigeration systems, condenser subcooling can be detected by monitoring the liquid level in a phase separator (not shown) disposed in the refrigeration circuit between the condenser 14 and the valve 16. A phase separator, also known as a receiver, is an enlarged tube section or bottle which collects liquid refrigerant in the bottom thereof and any gaseous refrigerant in its upper portion so that only liquid refrigerant is discharged to the valve 16. Such devices are well known in the art. The liquid level is indicative of subcooling because as long as the condenser 14 is discharging two phase refrigerant, subcooling is not present. But if subcooling is present, only liquid refrigerant is discharged from the condenser 14, and the liquid level in the phase separator will increase. Thus, an increasing liquid level will indicate probable existence of condenser subcooling. The sensing circuit 30 can include a liquid level sensor located in the phase separator. The pulse width of the control signal 32 can be adjusted to control the phase separator liquid level so as to maintain minimal condenser subcooling.

While specific conditions to be detected by the sensing circuit 30 have been described, these are intended to be illustrative and not limitative. It should be noted that the present invention will be applicable to any parameter which provides a basis for controlling the valve 16.

Figure 2:
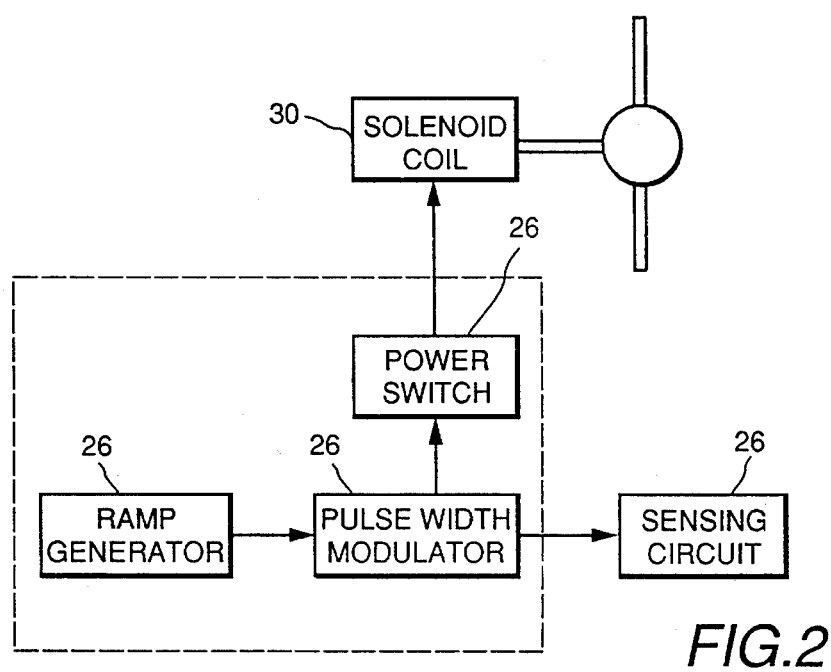
FIG. 2 is a functional block diagram of a expansion valve control circuit in accordance with the present invention.

Turning now to FIG. 2, there is shown a functional block diagram of the expansion valve control circuit 26. The control circuit 26 comprises a pulse width modulator 34, a ramp generator 36, and a power switch 38. The pulse width modulator 34 receives the sensor signal 28 from the sensing circuit 30 and a reference signal 40 produced by the ramp generator 36. The pulse width modulator 34 compares the sensor and reference signals and outputs a pulse width modulated signal 42 to the power switch 38. Specifically, the pulse width modulator 34 triggers a positive output voltage whenever the sensor signal 28 exceeds the ramp reference signal 40. Thus, the pulse width modulated signal 42 is a square wave which alternates between maximum and minimum voltages. The pulse width modulated signal 42 drives the power switch 38 which feeds the control signal 32 to the solenoid coil 44 of the valve 16, causing the opening and closing of the valve 16.

Figure 3A:
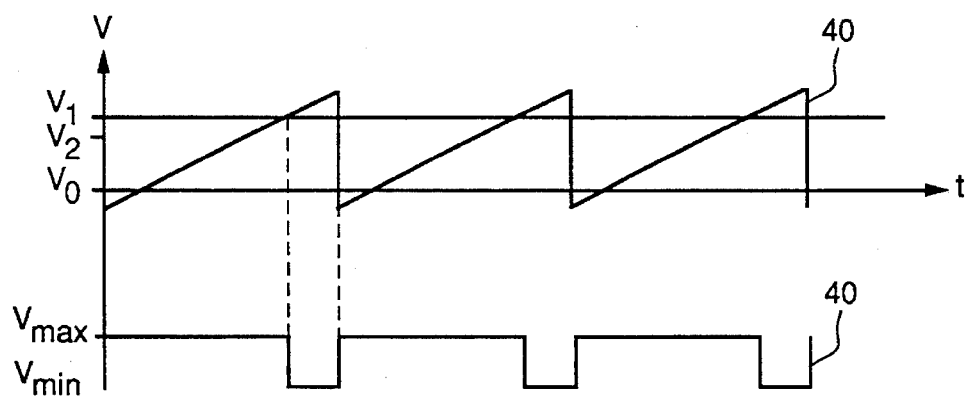
FIGS. 3A–3C show exemplary reference signals used in accordance with the present invention and the corresponding signals produced by a pulse width modulator.
Figure 3B:
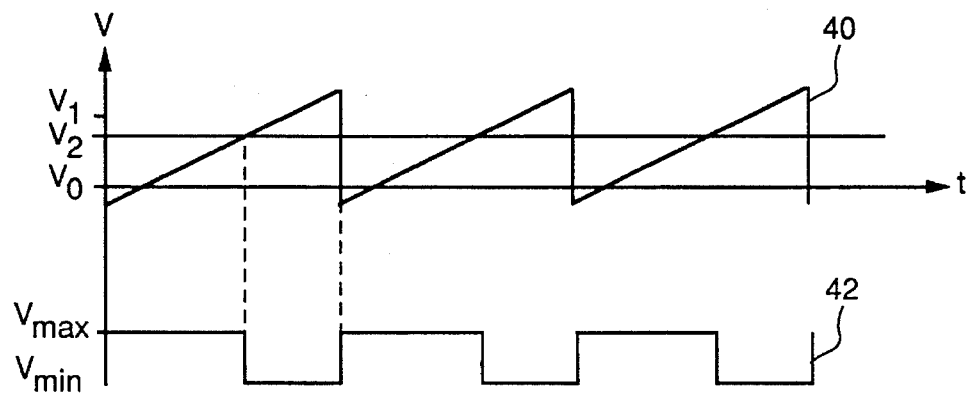
Figure 3C:
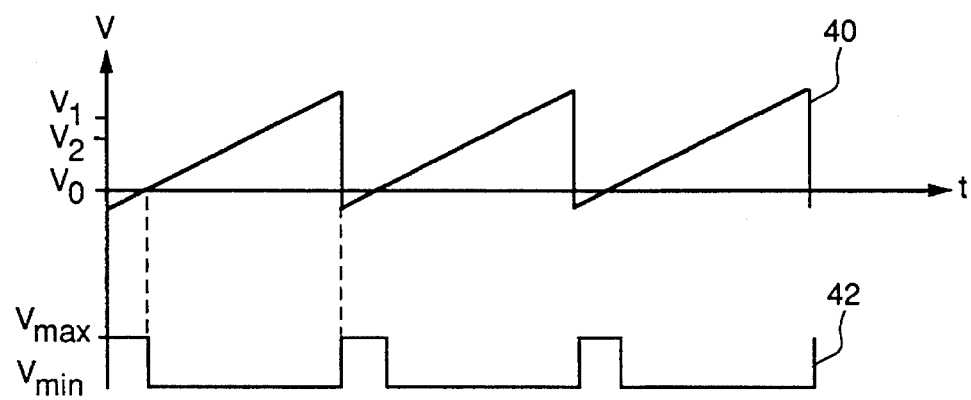

FIGS. 3A–3C each show an exemplary reference signal 40 and a corresponding pulse width modulated signal 42 for various sensor signals 28. Each reference signal 40 is a ramp wave having a preselected height and slope and a frequency which is preferably set in the range of about 0.1–2 hertz. The reference signal 40 is offset so that a portion of each ramp segment has a negative voltage. FIG. 3A shows the pulse width modulated signal 42 which is produced by the pulse width modulator 34 when the sensor signal 28 assumes a positive voltage $V_1$, FIG. 3B shows the pulse width modulated signal 42 which is produced when the sensor signal 28 assumes a positive voltage voltage $V_2$ which is less than $V_1$, and FIG. 3C shows the pulse width modulated signal 42 which is produced when the sensor signal 28 assumes a zero voltage $V_0$.

The pulse width modulator 34 outputs a maximum voltage $V_{max}$ when the sensor signal 28 exceeds the reference signal 40 and a minimum voltage $V_{min}$ (typically zero) when the sensor signal 28 does not exceed the reference signal 40. FIGS. 3A–3C show how the duration of the maximum voltage $V_{max}$ for each cycle is dependent on the level of the sensor signal 28. In FIG. 3A where the sensor signal 28 has voltage $V_1$ which is near the top of the ramp, the pulse width modulated signal 42 assumes the maximum voltage $V_{max}$ for a large portion of each cycle. In FIG. 3B where the sensor signal 28 assumes the lesser voltage $V_2$, the pulse width modulated signal 42 is at the maximum voltage $V_{max}$ for a smaller portion of each cycle. In FIG. 3C where the sensor signal 28 assumes zero voltage $V_0$, the pulse width modulated signal 42 is at the maximum voltage $V_{max}$ for an even smaller portion of each cycle. Thus, because of the negative offset of the reference signal 40, a minimum flow through the valve is assured as long as the sensing circuit 30 is constructed so as not to produce a sensor signal 28 which falls significantly below zero. This permits stable operation of the valve 16 during start up, defrost, pulldown, and other transient operations of the refrigeration system 10.

In operation, the power switch 38 is activated whenever the pulse width modulated signal 42 assumes the maximum voltage $V_{max}$, and the resulting control signal 32 causes the solenoid coil 44 to move the valve 16 to its fully open condition. When the pulse width modulated signal 42 assumes the minimum voltage $V_{min}$, the power switch 38 is inactivated, causing the valve 16 to be moved to the fully closed condition. The average flow rate through the expansion valve 16 is dependent on the time the valve 16 is fully open with respect to the time the valve 16 is fully closed (i.e., the duty cycle of the valve), wherein a large duty cycle corresponds to a large average flow rate. Thus, as seen from FIGS. 3A–3C, an increased sensor signal 28 (indicating a higher demand for refrigerant), causes the control circuit 26 to adjust the pulse width modulated signal 42 so that the duty cycle is increased, thereby producing a larger average flow rate.

It should be noted that if the condition detected by the sensing circuit 30 is such that a decreasing sensor signal 28 indicates an increased demand for refrigerant, then the reference signal 40 will need to have have a negative slope instead of the positive slope shown in FIGS. 3A–3C. Furthermore, the pulse width modulated signal 42 can have brief transition periods between the maximum and minimum voltages instead of the instantaneous voltage changes shown in FIGS. 3A–3C. This avoids the problem of a pressure shockwave being generated in the refrigerant which can occur when an expansion valve is abruptly opened and closed. The frequency of the pulse width modulated signal 42, and the control signal 32, is dictated by the frequency of the reference signal 40 and is constant regardless of system flow rate demand conditions.

Figure 4:
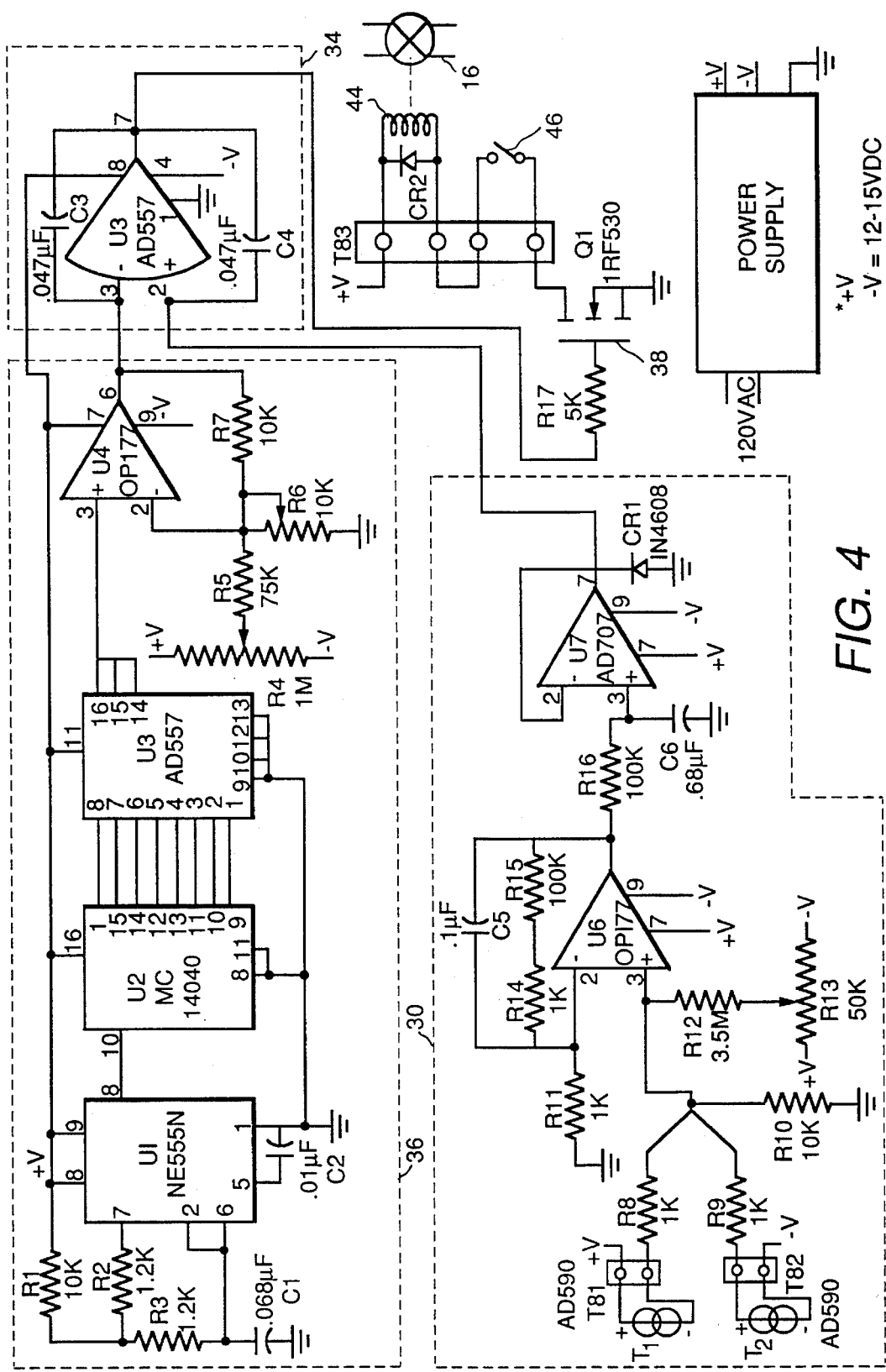
FIG. 4 is a detailed circuit diagram of the expansion valve control circuit of FIG. 2.

FIG. 4 illustrates a detailed circuit diagram of one embodiment the expansion valve control circuit 26 of FIG. 2. As can be seen in FIG. 4, the sensing circuit 30 includes two solid state temperature sensors T1,T2 configured across a voltage source such that their common output junction forms a temperature difference signal. Alternatively, the two temperature sensors T1,T2 could be input into a differential amplifier to generate the temperature difference signal. The two temperature sensors T1,T2 are positioned on the refrigeration system 10 depending on which condition is to be detected for valve control. Of course, the present invention can be used with a single temperature sensor or a liquid level sensor, as discussed above.

The ramp generator 36 includes an oscillator U1, a counter U2, and a digital-to-analog converter U3, while a comparator U5 is the primary component of the pulse width modulator 34. The power switch 38 comprises a field effect transistor which energizes the solenoid coil 44 whenever the pulse width modulated signal 42 is high. The power switch 38 can comprise a solid state relay as an alternative to the field effect transistor. A solid state relay will be useful when the solenoid coil 44 is an AC coil.

The operation of the integrated circuitry shown in FIG. 4 will be clear to one of ordinary skill in the art from the detailed circuit diagram, and accordingly, further description of the circuitry and its operation will not be provided. However, features not previously discussed are illustrated in the detailed circuit diagram. For example, the sensing circuit 30 includes means for damping its output, the sensor signal 28. This provides time for a change in the valve flow rate to propagate through the refrigeration system 10. As shown in FIG. 4, an R/C damping circuit comprising the resistor R16 and the capacitor C6 is used, although more sophisticated schemes such as a known sample and hold circuit could be employed. The electronic damping could be enhanced or even replaced by simply locating and/or attaching the temperature sensors so that thermal contact is limited to produce a damping effect. In addition, the temperature sensors could be thermally insulated.

The ramp generator 36 includes a variable resistor R6 which controls the ramp height and another variable resistor R4 which controls the offset of the ramp. A negative ramp offset of about two volts assures a minimum flow through the valve 16 as long as the sensor signal 28 does not fall significantly below zero. To this end, the sensing circuit 30 includes a diode CR1 which limits any negative sensor signal 28 (to approximately −700 millivolts) which may otherwise occur during off cycle temperature fluctuations. By providing a ramp offset which produces a minimum duty cycle of about 10–15% on time, stable operation of the valve 16 is assured even during start up, defrost, pulldown, and other transient operations of the refrigeration system 10.

The sensing circuit 30 also includes a variable resistor R13 for adjustment of the target temperature (or other control condition) value which is set for optimal system performance. The resistor R13 provides a means for biasing the sensor signal 28; by adding a positive bias to the signal, the ramp is intersected at a nominally higher voltage, and the pulse width modulator 34 increases the valve duty cycle, thereby lowering the target value. In order to permit the bias to adjust to changes in ambient temperatures, the resistor R13 can be a thermistor. The thermistor would be employed so that positive bias is decreased as the ambient temperature (and valve inlet pressure) increases.

Another feature is a switch 46 connected in series with the solenoid coil 44. The switch 46 is connected to the compressor control so that whenever the compressor 12 is shut down the switch 46 is opened. The power to the valve 16 is thus interrupted and the valve 16 remains closed during periods of compressor shut-down. This prevents refrigerant migration to the evaporator 18 during the off cycle, thereby conserving energy. The solenoid valve 16 therefore acts as an energy valve, eliminating the need for a separate valve to serve this function.

The present invention further includes constructing the expansion valve control circuit 26 and the valve 16 together to form a single expansion control module. The expansion control module will be placed in the refrigerated compartment so that the sensors will be in close proximity to their desired positions, eliminating the need for connection wires between the sensors and the electronics. Such an expansion control module will improve accuracy and reliability and will require only a single source of electrical power for both the the valve and the electronics.

The foregoing has described a control circuit useful in controlling a pulse width modulated solenoid valve for expansion control in a refrigeration system. While specific embodiments of the present invention have been described, it will be apparent to those skilled in the art that various modifications thereto can be made without departing from the spirit and scope of the invention as defined in the appended claims.

What is claimed is:

1. A control system for controlling an expansion valve in a refrigeration system, said control system comprising:

a sensing circuit arranged to sense a condition of said refrigeration system and produce a sensor signal corresponding to said condition;

a ramp generator for producing a reference signal in the form of a ramp wave having a preselected height, slope, and frequency, and including a negative ramp offset in each ramp segment; and a pulse width modulator having inputs connected to said sensing circuit and said ramp generator and an output connected to said valve, said pulse width modulator comparing said sensor signal and said reference signal and producing a maximum voltage whenever said sensor signal exceeds said reference signal, and a minimum voltage when said sensor signal does not exceed said reference signal, with said negative ramp offset effecting a minimum non-zero duty cycle for said expansion valve.

2. The control system of claim 1 wherein said pulse width modulator comprises a comparator.

3. The control system of claim 1 wherein said sensing circuit includes a diode arranged to limit negative values of said sensor signal from exceeding said negative ramp offset to effect said minimum duty cycle.

4. The control system of claim 1 wherein said sensing circuit includes at least one temperature sensor.

5. The control system of claim 1 wherein said sensing circuit includes two temperature sensors configured to produce a temperature difference signal for said sensor signal.

6. The control system of claim 1 wherein said sensing circuit includes a damping circuit.

7. The control system of claim 6 wherein said damping circuit is an R/C damping circuit.

8. The control system of claim 1 wherein said sensing circuit includes a resistor arranged to provide bias to said sensor signal.

9. The control system of claim 8 wherein said resistor is a variable resistor.

10. The control system of claim 8 wherein said resistor is a thermistor.

11. The control system of claim 1 wherein said ramp generator includes an oscillator.

12. The control system of claim 1 wherein said ramp generator includes a resistor arranged to provide said negative ramp offset.

13. The control system of claim 12 wherein said resistor is a variable resistor.

14. The control system of claim 1 wherein said expansion valve is a solenoid valve having a solenoid coil.

15. The control system of claim 14 further comprising a field effect transistor connected between said pulse width modulator and said solenoid coil.

16. The control system of claim 14 further comprising a solid state relay connected between said pulse width modulator and said solenoid coil.

17. The control system of claim 14 further comprising a power supply and a switch connected in series with said solenoid coil and said power supply, said switch being opened whenever said refrigeration system is shut down.

18. A control system for controlling a solenoid expansion valve having a solenoid coil in a refrigeration system, said control system comprising:

a power supply;

a sensing circuit arranged to sense a condition of said refrigeration system and produce a sensor signal corresponding to said condition;

a ramp generator for producing a reference signal;

a pulse width modulator having inputs connected to said sensing circuit and said ramp generator and an output connected to said valve, said pulse width modulator comparing said sensor signal and said reference signal and producing a positive voltage whenever said sensor signal exceeds said reference signal; and a switch connected in series with said solenoid coil and said power supply, said switch being opened whenever said refrigeration system is shut down.

* * * * *